United States Patent
Matsunaga et al.

(10) Patent No.: US 11,414,074 B2
(45) Date of Patent: Aug. 16, 2022

(54) DRIVING SUPPORT DEVICE

(71) Applicant: DENSO CORPORATION, Kariya (JP)

(72) Inventors: Shogo Matsunaga, Kariya (JP); Daisuke Nagasaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 309 days.

(21) Appl. No.: 16/735,982

(22) Filed: Jan. 7, 2020

(65) Prior Publication Data

US 2020/0180616 A1 Jun. 11, 2020

Related U.S. Application Data

(63) Continuation of application No. PCT/JP2018/024419, filed on Jun. 27, 2018.

(30) Foreign Application Priority Data

Jul. 11, 2017 (JP) .............................. JP2017-135476

(51) Int. Cl.
*B60W 30/095* (2012.01)
*G08G 1/16* (2006.01)

(52) U.S. Cl.
CPC ..... *B60W 30/0956* (2013.01); *B60W 2552/53* (2020.02); *B60W 2554/4041* (2020.02); *B60W 2554/4043* (2020.02); *G08G 1/166* (2013.01)

(58) Field of Classification Search
CPC ......... B60W 30/0956; B60W 2552/53; B60W 2554/4041; B60W 2554/4043; G08G 1/166
See application file for complete search history.

(56) References Cited

U.S. PATENT DOCUMENTS

| | | | | |
|---|---|---|---|---|
| 2013/0060443 | A1* | 3/2013 | Shida | B60K 31/0008 701/96 |
| 2014/0114548 | A1* | 4/2014 | Kagerer | B60W 30/16 701/96 |
| 2017/0305422 | A1* | 10/2017 | Ito | B60W 50/14 |
| 2018/0001894 | A1 | 1/2018 | Masui et al. | |
| 2018/0281857 | A1* | 10/2018 | Choi | B60W 30/0956 |

FOREIGN PATENT DOCUMENTS

| | | |
|---|---|---|
| JP | 2003-016599 A | 1/2003 |
| JP | 2005-145282 A | 6/2005 |
| JP | 2008-046845 A | 2/2008 |
| JP | 2011-196943 A | 10/2011 |
| JP | 2016-134093 A | 7/2016 |

\* cited by examiner

*Primary Examiner* — Anshul Sood
(74) *Attorney, Agent, or Firm* — Maschoff Brennan

(57) ABSTRACT

A driving support device includes: an acquisition unit that acquires a lateral position, lateral velocity, and lateral acceleration of another vehicle; a first determination unit that, based on the lateral position and lateral velocity of the other vehicle, determines that the other vehicle is moving toward an own lane; a second determination unit that, when the first determination unit determines the movement of the other vehicle, determines whether the lateral acceleration of the other vehicle has increased to a negative side in the own lane; and a driving support unit that, when the first determination unit determines that the other vehicle is moving toward the own lane and the second determination unit does not determine that the lateral acceleration of the other vehicle has increased to the negative side, does not set the other vehicle as a target vehicle of the driving support.

8 Claims, 5 Drawing Sheets

DRIVING SUPPORT DEVICE

CROSS-REFERENCE TO RELATED APPLICATION

This application is a U.S. application under 35 U.S.C. 111(a) and 363 that claims the benefit under 35 U.S.C. 120 from International Application No. PCT/JP2018/024419 filed on Jun. 27, 2018, the entire contents of which are incorporated herein by reference. This application is also based on Japanese Patent Application No. 2017-135476 filed on Jul. 11, 2017, the description of which is incorporated herein by reference.

BACKGROUND

Technical Field

The present disclosure relates to a driving support device that detects another vehicle existing on the periphery of an own vehicle and controls the own vehicle.

Background Art

In recent years, vehicles have been increasingly equipped with a driving support device that avoids a collision between an own vehicle and another vehicle caused by the other vehicle entering into the traveling path of the own vehicle from the lateral direction. For example, a conventional driving support device determines the cut-in status of another vehicle based on the lateral distance to the other vehicle as seen in the lateral direction.

SUMMARY

A driving support device is applied to a vehicle equipped with a vehicle detection device that detects another vehicle to perform driving support of the own vehicle. The driving support device includes: an acquisition unit that, based on the detection information about the other vehicle, acquires a lateral position, lateral velocity, and lateral acceleration of the other vehicle in a cross direction; a first determination unit that determines that the other vehicle is moving toward an own lane; a second determination unit that determines whether the lateral acceleration of the other vehicle has increased to a negative side in the own lane; and a driving support unit that when the first determination unit determines that the other vehicle is moving toward the own lane and the second determination unit does not determine that the lateral acceleration of the other vehicle has increased to the negative side, does not set the other vehicle as a target vehicle of the driving support in the own lane.

BRIEF DESCRIPTION OF THE DRAWINGS

The foregoing and other objects, features, and advantages of the present disclosure will be more clarified by the following detailed descriptions with reference to the accompanying drawings. The drawings are as follows.

DETAILED DESCRIPTION OF THE PREFERRED EMBODIMENTS

As mentioned above, the conventional driving support device disclosed in JP 2003-016599 A determines the cut-in status of another vehicle based on the lateral distance to the other vehicle as seen in the lateral direction.

In this manner, in the case where another vehicle comes closer in the lateral direction to the own lane in which the own vehicle is travelling, the driving support device described in JP 2003-016599 A determines whether the other vehicle is attempting to cut into the own lane from the adjacent lane, according to the lateral distance of the object and changes in the lateral distance. However, even if the other vehicle does not stay in the own lane but crosses over the own lane, the driving support device may determine that the other vehicle is cutting in and perform unnecessary driving support by issuing a warning or applying automatic brakes.

The present disclosure has been devised to solve the foregoing problem. A main object of the present disclosure is to provide a driving support device that suppress execution of unnecessary driving support for another vehicle crossing over in front of the own vehicle.

A driving support device to solve the foregoing problem is applied to a vehicle equipped with a vehicle detection device that detects another vehicle on the periphery of an own vehicle to perform driving support of the own vehicle based on detection information about the other vehicle obtained from the vehicle detection device. The driving support device includes: an acquisition unit that, based on the detection information about the other vehicle, acquires a lateral position, lateral velocity, and lateral acceleration of the other vehicle in a cross direction crossing a traveling direction of the own vehicle; a first determination unit that, based on the lateral position and lateral velocity of the other vehicle, determines that the other vehicle travelling in an adjacent lane next to an own lane in which the own vehicle is travelling is moving toward the own lane; a second determination unit that, when the first determination unit determines that the other vehicle is moving, determines whether the lateral acceleration of the other vehicle has increased to a negative side in the own lane; and a driving support unit that, when the second determination unit determines that the lateral acceleration of the other vehicle has increased to the negative side, sets the other vehicle as a target vehicle of the driving support in the own lane, whereas when the first determination unit determines that the other vehicle is moving toward the own lane and the second determination unit does not determine that the lateral acceleration of the other vehicle has increased to the negative side, does not set the other vehicle as a target vehicle of the driving support in the own lane.

The first determination unit determines that the other vehicle is moving from the adjacent lane toward the own lane based on the lateral position and lateral velocity of the other vehicle. When the first determination unit determines that the other vehicle is moving from the adjacent lane toward the own lane, the first determination unit determines whether the lateral acceleration of the other vehicle has increased to the negative side in the own lane. When the first determination unit determines that the other vehicle is moving toward the own lane and the second determination unit does not determine that the lateral acceleration of the other vehicle has increased to the negative side in the own lane, the driving support unit does not set the other vehicle as a target vehicle of the driving support in the own lane.

This allows appropriate determination on whether the other vehicle is entering (cutting) into the own lane or crossing over the own lane. This suppresses execution of unnecessary driving support for the other vehicle crossing over the own lane.

Making the determination based on the lateral acceleration eliminates the need to wait until the lateral velocity becomes equal to or lower than a predetermined velocity in the own lane and allows early determination. Thus, in the case of making the determination based on the lateral acceleration, it is possible to perform the driving support earlier than in the case where the determination is made based on the lateral velocity.

Hereinafter, embodiments will be described with reference to the drawings. Identical or equivalent components in the following embodiments are illustrated with the same reference signs in the drawings, and descriptions of the components with the same reference signs will be incorporated by reference. A driving support device according to the present embodiment is mounted in a vehicle (own vehicle) to perform driving support based on information about another vehicle existing on the periphery of the own vehicle such as in front of the own vehicle.

Figure 1:
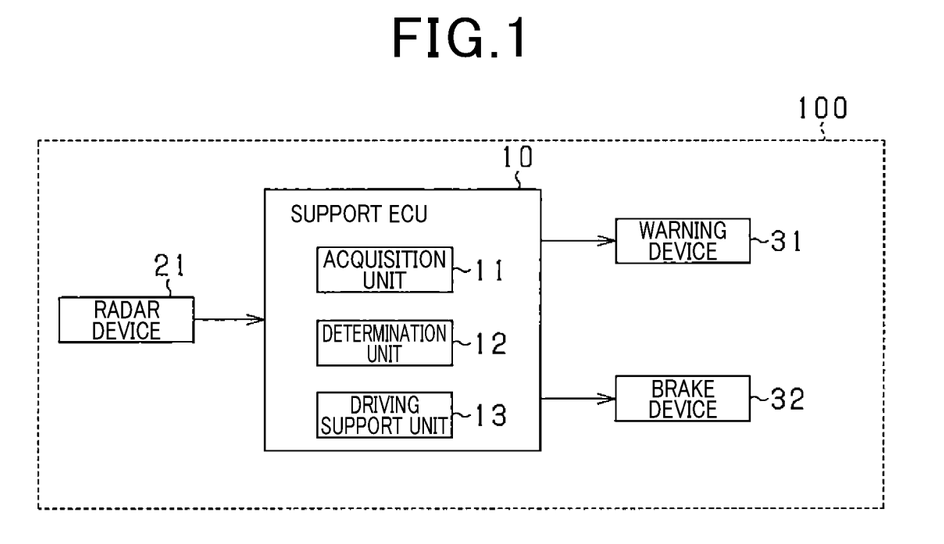
FIG. 1 is a block diagram of a PCS system.

FIG. 1 illustrates a pre-crash-safety (PCS) system 100 that performs a control to avoid a collision with another vehicle or reduce collision damage. As illustrated in FIG. 1, the PCS system 100 includes a support ECU 10, a radar device 21, a warning device 31, and a brake device 32. In the embodiment illustrated in FIG. 1, the support ECU 10 serves as a driving support device.

The radar device 21 is a publicly known millimeter wave radar that uses high frequency signals in a millimeter wave band as transmission waves, for example, and is provided at the front-end part of the own vehicle. The radar device 21 has an area at a predetermined detection angle as a detection range and detects another vehicle in the detection range. Specifically, the radar device 21 transmits exploration waves in a predetermined cycle and receives reflection waves by a plurality of antennas. The radar device 21 calculates the distance to the other vehicle from the transmission time of the exploration waves and the reception time of the reflection waves. The radar device 21 calculates the velocity of the other vehicle (velocity relative to the own vehicle) from the frequency of the reflection waves reflected by the other vehicle that has changed due to the Doppler effect. In addition, the radar device 21 calculates the azimuth of the other vehicle from phase differences among the reflection waves received by the plurality of antennas.

With the calculated position and azimuth of the other vehicle, the position of the other vehicle (the position relative to the own vehicle) can be specified. Accordingly, the radar device 21 corresponds to a vehicle detection device. The radar device 21 transmits the exploration waves, receives the reflection waves, and calculates the position and velocity of the other vehicle in each predetermined cycle. The radar device 21 is communicable with the support ECU 10 and transmits the calculated position and velocity to the support ECU 10.

The warning device 31 has a speaker and a display installed in the interior of the own vehicle. When determining that there is a high probability of a collision between the other vehicle and the own vehicle, the support ECU 10 outputs a control command to the warning device 31, thereby causing the warning device 31 to output a warning sound, a warning message, or the like. Accordingly, the driver is informed of the risk of a collision.

The brake device 32 includes a brake mechanism that changes a braking force of the own vehicle and a brake ECU that controls operations of the brake mechanism. The brake ECU is communicably connected to the support ECU 10 and controls the brake mechanism under control of the support ECU 10. The brake mechanism includes a master cylinder, a wheel cylinder that provides a braking force to the wheels (tires), and an ABS actuator that adjusts distribution of pressure (hydraulic pressure) from the master cylinder to the wheel cylinder. The ABS actuator is connected to the brake ECU and adjusts the hydraulic pressure from the master cylinder to the wheel cylinder under control of the brake ECU, to thereby adjust the amount of operation on the wheels (tires).

The support ECU 10 is a computer including a CPU, a RAM, a ROM, an I/O, and others. The support ECU 10 implements various functions by the CPU executing programs installed in the ROM. The various functions may be implemented by an electronic circuit as hardware or may be at least partially implemented by software, that is, by a process executed on a computer.

In the present embodiment, the programs installed in the ROM include a control program for detecting another vehicle existing in front of the own vehicle and performing prescribed driving support based on information about the other vehicle (the calculated position, velocity, and others) detected by the radar device 21, for example.

At the execution of the driving support, the support ECU 10 calculates a time-to-collision (TTC) that is a time until there occurs a collision between the own vehicle and other vehicle. Specifically, based on the relative distance (in-vehicle distance) between the own vehicle and the other vehicle and the relative velocities of the same, the support ECU 10 calculates the time-to-collision by dividing the relative distance by the relative velocity, for example. The support ECU 10 then determines the probability of a collision between the own vehicle and the other vehicle based on the calculated time-to-collision. When determining that there is a high probability of a collision (for example, when the time-to-collision is shorter than a predetermined time), the support ECU 10 causes the driving support to be performed. However, in the case where the driving support is performed according to the determination on the probability of a collision between the own vehicle and the other vehicle based on the time-to-collision, the driving support may be unnecessary.

Figure 2A:
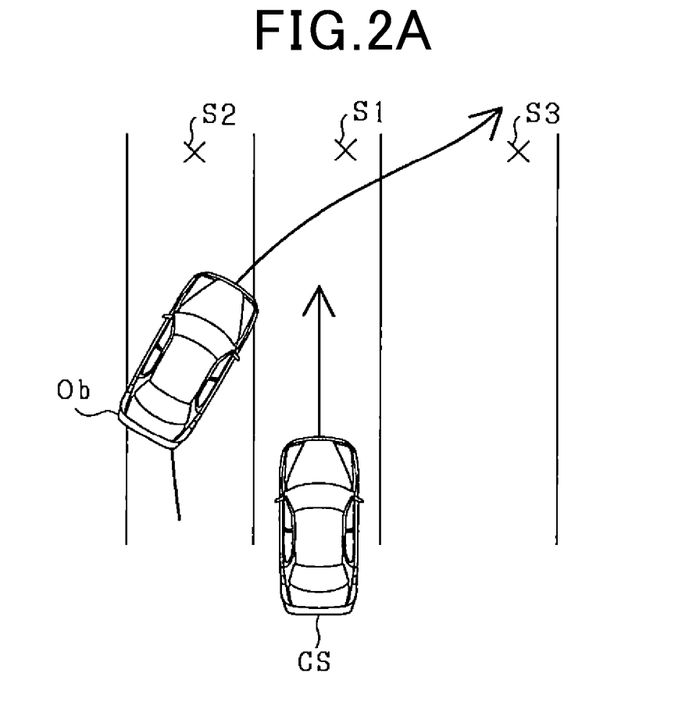
FIGS. 2A and 2B are diagrams describing a lane change by another vehicle.

For example, as illustrated in FIG. 2A, another vehicle Ob travelling in a left lane S2 as a lane adjacent to an own lane S1 may cross over the own lane S1 in which the own vehicle CS is travelling and move to a right lane S3 next to the own lane S1. In this case, when the time-to-collision is short at a point in time when the other vehicle Ob has moved from the left lane S2 to the own lane S1, it may be determined that the own vehicle and the other vehicle will collide with each other so that the unnecessary driving support (for example, braking of the vehicle) may be performed even though the other vehicle Ob crosses over in front of the own vehicle Cs and moves to the right lane S3. That is, it may be wrongly recognized that the other vehicle Ob travelling in the left lane S2 has moved (cut) into the own lane S1, so that unnecessary driving support may be performed.

Thus, in the present embodiment, in order to suppress unnecessary driving support from being performed for the other vehicle crossing over the own lane, it is correctly determined whether the other vehicle will cut into the own lane. Hereinafter, a configuration of the support ECU 10 to cause appropriate execution of the driving support and a process executed by the support ECU 10 will be described in detail.

As illustrated in FIG. 1, as a function of the support ECU 10, the acquisition unit 11 acquires the lateral position, lateral velocity, and lateral acceleration of the other vehicle, for example. More specifically, the support ECU 10 detects the lateral position and lateral velocity of the other vehicle in a crossing direction that crosses (for example, is orthogonal to) the traveling direction of the own vehicle, based on the information about the other vehicle (azimuth, position, and velocity) detected by the radar device 21. Then, the support ECU 10 as the acquisition unit 11 acquires the lateral position and lateral velocity of the other vehicle.

The support ECU 10 also stores the information about the other vehicle (lateral position, lateral velocity, and others) as a history in the RAM or the like. Based on the history, the support ECU 10 calculates the lateral acceleration of the other vehicle in the crossing direction that crosses (for example, is orthogonal to) the traveling direction of the own vehicle. For example, the support ECU 10 refers to the history to specify changes in the lateral velocity of the other vehicle and calculate the lateral acceleration of the other vehicle based on the changes in the lateral velocity. Then, the support ECU 10 as the acquisition unit 11 acquires the calculated lateral acceleration.

In addition, as a function of the support ECU 10, the determination unit 12 determines the movement of the other vehicle into the own lane as a travelling area in which the own vehicle is travelling, for example. More specifically, the support ECU 10 as the determination unit 12 determines the start of movement of the other vehicle from the adjacent lane as an adjacent area next to the own vehicle into the own lane, based on the lateral position and lateral velocity of the other vehicle acquired by the acquisition unit 11. That is, the support ECU 10 serves as a first determination unit that, based on the lateral position and lateral velocity of the other vehicle, determines that the other vehicle travelling in the adjacent lane next to the own lane in which the own vehicle is travelling is moving toward the own lane.

After determining the start of the movement, the support ECU 10 as the determination unit 12 determines that the movement of the other vehicle into the own lane has been completed when the lateral acceleration of the other vehicle has increased to the negative side (opposite to the direction of the lateral velocity of the other vehicle). That is, the support ECU 10 serves as a second determination unit that, when determining the movement of the other vehicle, determines whether the lateral acceleration of the other vehicle has increased to the negative side in the own lane.

Further, as a function of the support ECU 10, the driving support unit 13 executes the driving support, for example. More specifically, when determining that the other vehicle is moving toward the own lane and determining that the lateral acceleration of the other vehicle has increased to the negative side in the own lane, the support ECU 10 as the driving support unit 13 executes the driving support of the own vehicle while setting the other vehicle as a target vehicle (collision target vehicle) of the driving support in the own lane. On the other hand, when determining that the other vehicle is moving toward the own lane and not determining that the lateral acceleration of the other vehicle has increased to the negative side in the own lane, the support ECU 10 as the driving support unit 13 does not set the other vehicle as a target vehicle of the driving support in the own lane. That is, the support ECU 10 restricts the driving support with the other vehicle as a target vehicle.

Figure 3:
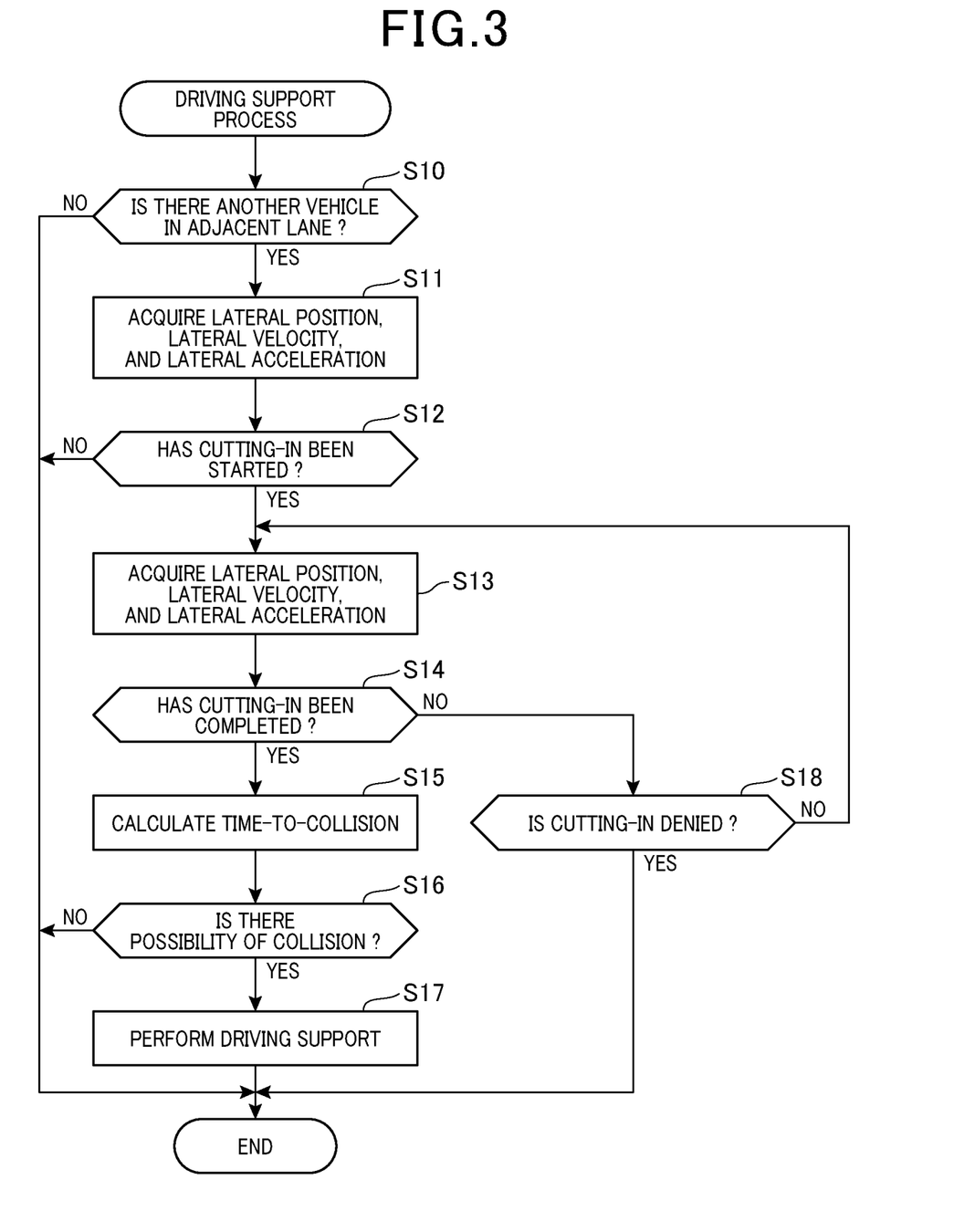
FIG. 3 is a flowchart of a driving support process.

Next, a driving support process will be described with reference to FIG. 3. The driving support process is executed by the support ECU 10 in each predetermined cycle.

In the driving support process, first, the support ECU 10 determines whether another vehicle exists in an adjacent lane in front of the own vehicle based on detection information from the radar device 21 (step S10). Specifically, the support ECU 10 defines the boundaries on the right and left sides of the own lane based on demarcation lines on the right and left sides of the own vehicle. The demarcation lines can be specified by a known method based on image information captured by an in-vehicle camera, for example. In this case, the support ECU 10 serves as a demarcation line detection unit.

Figure 2B:
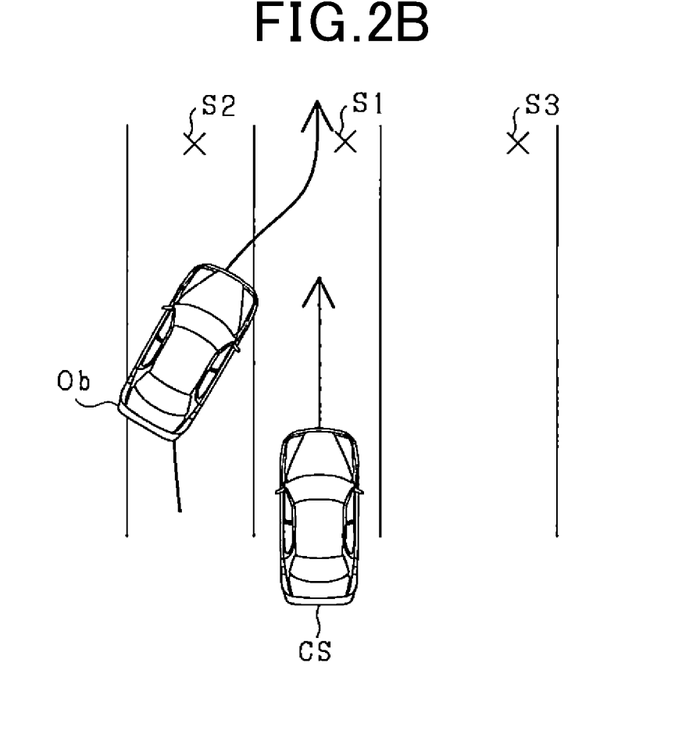

Based on the detection information from the radar device 21, the support ECU 10 determines whether another vehicle exists outside the own lane (that is, in the adjacent lane) as seen in a crossing direction (the horizontal direction in FIG. 2) to the specified own lane in front of the own vehicle.

In the present embodiment, it is determined that another vehicle exists in the adjacent lane when the other vehicle exists outside the own lane. Alternatively, all the demarcation lines may be specified so that the adjacent lane is specified based on the demarcation lines.

When not determining that another vehicle exists in the adjacent lane (step S10: NO), the support ECU 10 terminates the driving support process. On the other hand, when determining that another vehicle exists in the adjacent lane (step S10: YES), the support ECU 10 acquires the lateral position, lateral velocity, and lateral acceleration of the other vehicle as described above (step S11).

Next, the support ECU 10 determines whether the other vehicle in the adjacent lane has started to move (cut) into the own lane (step S12). More specifically, the support ECU 10 determines whether the other vehicle in the adjacent lane has moved in a direction approaching the own lane and the lateral velocity of the other vehicle is equal to or greater than a predetermined velocity threshold V1.

At the determination on whether the other vehicle is moving in the direction approaching the own lane, the support ECU 10 can refer to the history of the detection information, for example, to specify changes in the lateral position of the other vehicle, and determine whether the other vehicle is approaching based on the changes in the lateral position. In addition, at the determination of calculation of the lateral velocity, the support ECU 10 may calculate the direction of the lateral velocity in advance, for example, and determine whether the other vehicle is approaching based on the direction of the lateral velocity.

When the other vehicle existing in the adjacent lane is moving in the direction approaching the own lane and the lateral velocity of the other vehicle is equal to or greater than the predetermined velocity threshold V1, the support ECU 10 determines that the other vehicle has started movement into the own lane.

When not determining that the other vehicle has started the movement into the own lane (step S12: NO), the support ECU 10 terminates the driving support process.

On the other hand, when determining that the other vehicle has started the movement into the own lane (step S12: YES), the support ECU 10 acquires the lateral position, lateral velocity, and lateral acceleration of the other vehicle as described above (step S13). Then, the support ECU 10 determines whether the other vehicle having started the movement has completed the movement (cutting) into the own lane (step S14).

More specifically describing, in step S14, when the other vehicle exists in the own lane and the lateral acceleration of the other vehicle has increased to the negative side (opposite to the direction of the lateral velocity), the support ECU 10 determines that the other vehicle has completed the movement (cutting) into the own lane.

As illustrated in FIG. 2B, when the other vehicle Ob with a predetermined lateral velocity stays in the own lane S1 (that is, cut into the own lane S1), the lateral acceleration of the other vehicle Ob needs to increase in the opposite direction of the lateral velocity of the other vehicle Ob in the own lane S1. In particular, when the other vehicle Ob has a lateral velocity equal to or greater than the velocity threshold V1, in order to stay in the own lane S1, it is highly necessary for the other vehicle Ob to increase the lateral acceleration to the negative side until the lateral acceleration becomes equal to or greater than an acceleration threshold a1 in the own lane S1.

Thus, in the present embodiment, when the other vehicle is present in the own lane and the lateral acceleration of the other vehicle has increased to the negative side and when the lateral acceleration is equal to or greater than the acceleration threshold a1, the support ECU 10 determines that the other vehicle will completely cut into and stay in the own lane.

The acceleration threshold a1 is changed according to the lateral velocity of the other vehicle (for example, the lateral velocity at the time of entry into the own lane or the maximum value of the lateral velocity). That is, when the lateral velocity of the other vehicle is high, in order to stay in the own lane, it is necessary for the other vehicle to greatly increase the lateral acceleration to the negative side. On the other hand, when the lateral velocity of the other vehicle is low, in order to stay in the own lane, slightly increasing the lateral velocity to the negative side will suffice for the other vehicle. Thus, the acceleration threshold a1 is changed according to the lateral velocity of the other vehicle. For example, when the lateral velocity of the other vehicle is high, the acceleration threshold a1 is increased accordingly as compared to the case where the lateral velocity is low.

When determining that the movement into the own lane has been completed (step S14: YES), the support ECU 10 sets the other vehicle as a target vehicle of the driving support, and calculates the time-to-collision based on the relative distance and the relative velocity (step S15).

The support ECU 10 then determines whether there is a probability of a collision between the own vehicle and the other vehicle based on the time-to-collision (step S16). Specifically, when the time-to-collision is equal to or shorter than a predetermined first time, the support ECU 10 determines that there is a probability of a collision between the own vehicle and the other vehicle. In this case, the support ECU 10 serves as a collision determination unit. When not determining that there is a probability of a collision (step S16: NO), the support ECU 10 terminates the driving support process.

On the other hand, when determining that there is a probability of a collision (step S16: YES), the support ECU 10 performs the driving support (PCS) according to the time-to-collision (step S17). For example, when the time-to-collision is equal to or shorter than the first time, the support ECU 10 controls the warning device 31 to output a warning about a probability of a collision. When the time-to-collision is a second time, which is shorter than the first time, the support ECU 10 controls the brake device 32 to apply brakes to the vehicle instead of or in addition to the output of the warning. Then, the support ECU 10 terminates the driving support process.

On the other hand, when not determining that the movement into the own lane has been completed (step S14: NO), the support ECU 10 determines whether to deny the movement (cutting) of the other vehicle into the own lane based on the lateral position, lateral velocity, and others of the other vehicle (step S18). For example, when the other vehicle has crossed over the own lane and reached the adjacent lane (the lateral position has passed through the own lane and reached the adjacent lane), the support ECU 10 denies the movement (cutting) into the own vehicle. In addition, for example, when the lateral acceleration has increased to the negative side in the adjacent lane and become equal to or greater than the acceleration threshold a1, the support ECU 10 denies the movement (cutting) into the own lane. Also, for example, when the lateral velocity has become to 0 in the adjacent lane, the support ECU 10 denies the movement (cutting) into the own lane.

When not denying the movement into the own lane (step S18: NO), the support ECU 10 returns to step S13 after a lapse of a predetermined time, acquires the lateral position and others of the other vehicle, and determines whether the cutting into the own lane has been completed. On the other hand, when denying the movement of the other vehicle into the own lane (step S18: YES), the support ECU 10 terminates the driving support process.

Figure 4A:
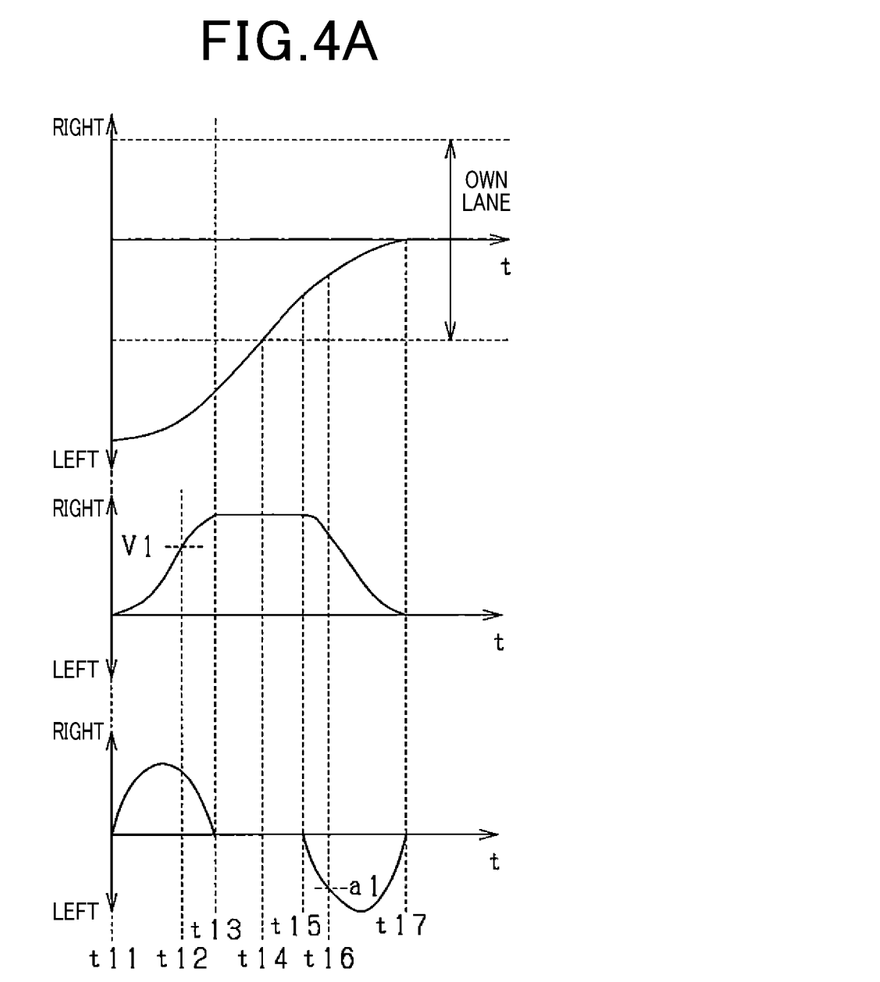
FIGS. 4A and 4B are time charts of the lateral position, lateral velocity, and lateral acceleration of the other vehicle at the time of a lane change.
Figure 4B:
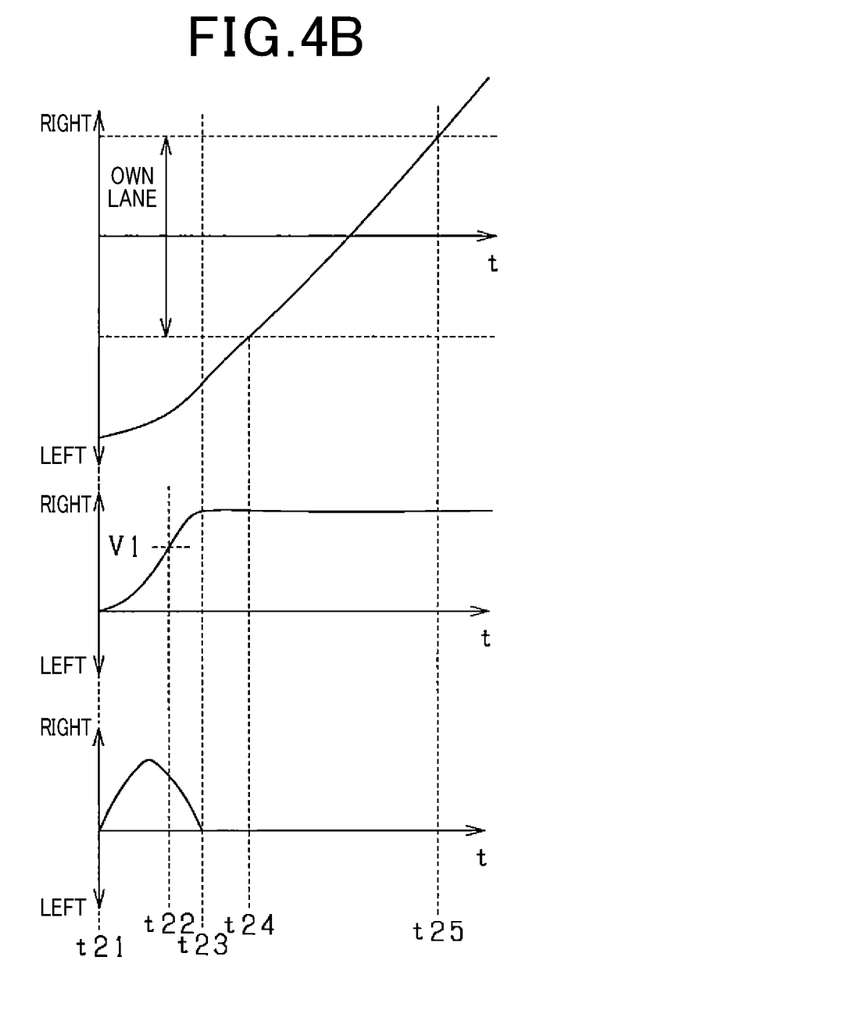

Next, changes in the lateral position, lateral velocity, and lateral acceleration of the other vehicle in the case where the other vehicle moves into the own lane will be described with reference to FIG. 4.

The case where the other vehicle moves (cuts) from the adjacent lane into the own lane will be described with reference to FIG. 4A. Referring to FIG. 4A, in the initial state, the other vehicle is located on the left side of the own lane (in the left lane), and the lateral velocity and the lateral acceleration are zero. Referring to FIG. 4, the upper side corresponds to the right side (rightward direction) of the own vehicle (the own lane), and the lower side corresponds to the left side (the leftward direction) of the own vehicle (the own lane).

At times t11 to t13, when the lateral acceleration increases in the rightward direction, the lateral velocity in the rightward direction (to the own lane) increases accordingly. Then, the other vehicle starts movement to the right. That is, the other vehicle approaches the own lane. At time t12, the lateral velocity towards the own lane becomes equal to or greater than the velocity threshold V1, and it is determined that the other vehicle has started movement (cutting) into the own lane.

At times t13 to t15, the lateral acceleration is zero and thus the other vehicle moves in the rightward direction at a constant velocity. At time t14, the other vehicle enters into the own lane.

At times t15 to t17, when the other vehicle exits in the own lane, the lateral velocity of the other vehicle in the leftward direction increases. Accordingly, the lateral velocity in the rightward direction decreases and the amount of the lateral movement in the rightward direction decreases.

At time t16, when the lateral acceleration of the other vehicle in the leftward direction has increased and become equal to or greater than the acceleration threshold a1, it is determined that the movement into the own lane has been completed, and the driving support is performed. At time t17, the lateral velocity and the lateral acceleration become zero and the other vehicle stays in the own lane.

As described above, when the other vehicle moves from the adjacent lane into the own lane, the lateral acceleration increases to the negative side in the own lane. This makes it possible to appropriately determine whether the other vehicle is cutting in. In addition, when the lateral acceleration has increased to the negative side and become equal to or greater than the acceleration threshold a1, it is determined that this is movement (cutting) into the own lane even if the lateral velocity does not become equal to or greater than a predetermined value. This allows early determination on the movement into the own lane.

A case where the other vehicle moves from the adjacent lane into the own lane and crosses over in front of the own vehicle to another adjacent lane (a case of non-cutting in) will be described with reference to FIG. 4B. Referring to FIG. 4B, in the initial state, the other vehicle is located on the left side (in the left lane) of the own lane, and the lateral velocity and the lateral acceleration are zero.

At times t21 to t23, when the lateral acceleration in the rightward direction increases, the lateral velocity in the rightward direction (to the own lane) increases accordingly. Then, the other vehicle starts movement into the right. That is, the other vehicle approaches the own lane. At time t22, the lateral velocity towards the own lane becomes equal to or greater than the velocity threshold V1, and it is determined that the other vehicle has started movement (cutting) into the own lane.

At time t23 and later, the lateral acceleration is zero and thus the other vehicle moves in the rightward direction at a constant velocity. At time t24, the other vehicle enters into the own lane.

At times t23 to t25, the lateral acceleration does not increase in the leftward direction and thus it is not determined that the movement into the own lane has been completed, and the driving support is restricted.

At time t25, the other vehicle enters into the right lane (adjacent lane). Accordingly, the movement (cutting) of the other vehicle into the own lane is denied and the driving support process is terminated without execution of the driving support.

As described above, even if the other vehicle crosses over in front of the own lane from the adjacent lane and moves into the other adjacent lane, the lateral acceleration does not increase to the negative side in the own lane. This makes it possible to appropriately determine whether this is cutting into the own lane.

According to the foregoing configuration, the present embodiment exhibits advantageous effects below.

The support ECU 10 determines whether the other vehicle is moving from the adjacent lane toward the own lane (having started to cut into the own lane) based on the lateral position and lateral velocity of the other vehicle. When determining that the other vehicle is moving toward the own lane, the support ECU 10 determines that the movement of the other vehicle from the adjacent lane into the own lane has been completed based on whether the lateral acceleration of the other vehicle has increased to the negative side in the own lane. That is, the support ECU 10 determines that the other vehicle has made a lane change to the own lane. Accordingly, it is possible to appropriately determine whether the other vehicle enters (cuts) into the own lane or crosses over the own lane. When not determining that the movement of the own vehicle from the adjacent lane into the own lane has been completed, that is, when not determining that the lateral acceleration has increased to the negative side in the own lane, the support ECU 10 restricts the execution of the driving support. This suppresses the execution of unnecessary driving support for the other vehicle crossing over the own lane.

Determining whether the other vehicle is cutting into the own lane based on the lateral acceleration eliminates the need to wait until the lateral velocity of the other vehicle becomes equal to or less than a predetermined velocity in the own lane, thereby achieving early determination. Therefore, in the case of making the determination based on the lateral acceleration, it is possible to perform the driving support earlier than in the case of making the determination based on the lateral velocity.

When the lateral velocity of the other vehicle is high, the other vehicle cannot stay in the own lane without increasing the lateral acceleration to the negative side. On the other hand, when the lateral velocity of the other vehicle is low, the other vehicle can stay in the own lane even if the lateral acceleration to the negative side is low. Thus, the acceleration threshold a1 is set based on the lateral velocity of the other vehicle. Accordingly, it is possible to appropriately determine whether the other vehicle has completed cutting into the own lane based on the lateral acceleration even if the lateral velocity of the other vehicle differs.

The own lane in which the own vehicle is travelling is determined based on demarcation lines on both the right and left sides of the own vehicle. In this manner, determining the boundaries on both the right and left sides of the own vehicle based on the demarcation lines makes it easy to identify the own lane in which the own vehicle is travelling and determine whether the other vehicle will make a lane change.

When determining that the other vehicle is moving toward the own lane and the lateral velocity has not increased to the negative side from the entry of the other vehicle into the own lane to the arrival of the other vehicle in the adjacent lane, the support ECU 10 denies the movement of the other vehicle into the own lane. This makes it possible to appropriately determine that the other vehicle has crossed over the own lane and moved into the adjacent lane, thereby suppressing execution of unnecessary driving support.

When the other vehicle in the adjacent lane is moving in a direction that approaches the own lane and the lateral velocity of the other vehicle is equal to or greater than the predetermined velocity threshold V1, the support ECU 10 determines that the other vehicle is moving toward the own lane. This makes it possible to appropriately determine that the other vehicle has started to move from the adjacent lane into the own lane. When the other vehicle is moving in the direction that approaches the own vehicle and the lateral velocity of the other vehicle is equal to or greater than the velocity threshold V1, there is a low probability that the lateral velocity of the other vehicle in the own lane becomes zero unless the lateral acceleration of the other vehicle to the negative side increases to be equal to or greater than the acceleration threshold a1. This allows appropriate determination on whether the other vehicle will stay in the own lane.

The support ECU 10 determines the presence or absence of necessity of the driving support based on the time-to-collision calculated by the distance from the other vehicle and the relative velocity towards the other vehicle. Therefore, even if the other vehicle has cut into the own lane, no driving support will be performed when it is not determined that there is the need for driving support based on the time-to-collision. This makes it possible to suppress unnecessary driving support and perform the appropriate driving support.

Other Embodiments

The present disclosure is not limited to the foregoing embodiment but may be carried out as described below, for example. Identical or equivalent components in the following embodiments are given the same reference signs, and descriptions of the components with the same reference signs will be incorporated by reference.

In the foregoing embodiment, the support ECU 10 may perform the driving support (PCS) using a seatbelt device. The seatbelt device is formed from a seatbelt provided at each seat of the own vehicle and a pretensioner for drawing the seatbelt. As an operation of PCS, the seatbelt device performs a preliminary operation of drawing the seatbelt when there is an increasing probability of a collision between the own vehicle and another vehicle. In the case where a collision is inevitable, the seatbelt device draws the seatbelt to remove the slack from the seatbelt so that passenger such as the driver is fixed to the seat for protection of the passenger.

In the foregoing embodiment, the brake device 32 may include a brake assist function of reinforcing the braking force corresponding to the driver's brake operation and an automatic brake function of applying automatic brakes even without the driver's brake operation. When the support ECU 10 controls the brake device 32 to perform the driving support, the brake device 32 may perform either the brake assist function or the automatic brake function according to the time-to-collision.

In the foregoing embodiment, the own lane as a travelling area of the own vehicle is defined by the demarcation lines. However, the own lane may be set by another method. For example, the support ECU 10 may define the boundaries of the travelling area on both the right and left sides by the width of the own vehicle or a predetermined width centered on the own vehicle. The predetermined width may be changed arbitrarily and may be set to a width with which there is a probability of a collision (for example, two folds the width of the own vehicle), for example. In addition, the predetermined width may be changed according to the velocity of the own vehicle or the velocity of the other vehicle.

In the foregoing embodiment, even if it is not determined that the cutting-in has been completed (step S14: NO), when the other vehicle exists in the own lane and its lateral velocity is equal to or lower than a predetermined value (for example, zero), the support ECU 10 may determine that the cutting-in has been completed and moves to step S15.

In the foregoing embodiment, when it is not determined that the cutting-in has been completed (step S14: NO) and when the other vehicle has become no longer detected (for example, the own vehicle has passed the other vehicle), the support ECU 10 may deny the cutting-in and terminate the driving support process.

In the foregoing embodiment, when it is not determined that the cutting-in has been completed (step S14: YES) from the start of the other vehicle's movement into (cutting into) the own lane (step S12: YES) to a lapse of a predetermined time, the support ECU 10 may deny the cutting-in and terminate the driving support process. In this case, step S18 may be omitted.

The other vehicle is not limited to a four-wheel automobile but may be a two-wheel automobile or a bicycle.

In the foregoing embodiment, when not determining that the cutting-in has been completed (step S14: NO), the support ECU 10 restricts the execution of the driving support. However, when there is a very high probability of a collision, for example, when the other vehicle exists in the own lane and the time-to-collision is very short (for example, shorter than the second time), the support ECU 10 may perform the driving support.

In the foregoing embodiment, when a plurality of other vehicles is detected, the driving support process may be executed for each of the vehicles or the driving support process may be executed only on the other vehicle closest to the own vehicle.

In the foregoing embodiment, it is determined whether there is a high probability of a collision between the own vehicle and the other vehicle based on the time-to-collision. However, the probability of a collision may be determined by another method. For example, the probability of a collision may be determined by specifying a predicted travelling path of the own vehicle based on the steering angle and velocity of the own vehicle, then specifying the predicted travelling path of the other vehicle based on the information about the other vehicle (position, velocity, and others), and then determining whether the predicted travelling paths will cross each other.

In the foregoing embodiment, the other vehicle is detected by the radar device 21. However, the other vehicle may be detected by other devices other than the radar device 21. The other vehicle may be detected based on image information captured by an in-vehicle camera, for example. Alternatively, the own vehicle and the other vehicle may be communicably configured so that the other vehicle can be detected based on information received from the other vehicle. Still alternatively, a laser sensor may be adopted.

In the foregoing embodiment, the radar device 21 calculates the velocity and position of the other vehicle. Alternatively, the information detected by the radar device 21 may be directly output to the support ECU 10 so that the support ECU 10 calculates the velocity and position of the other vehicle. Still alternatively, on the contrary, the radar device 21 may calculate the acceleration and others of the other vehicle and output the calculated results to the support ECU 10.

The present disclosure has been described so far according to the embodiments, but it is noted that the present disclosure is not limited to the foregoing embodiments or structures. The present disclosure includes various modifications and changes in the scope of equivalent. In addition, various combinations and modes, and other combinations and modes including only one element of the foregoing combinations and modes, less or more than the one element are included in the scope and conceptual range of the present disclosure.

What is claimed is:

1. A driving support device that is applied to an own vehicle equipped with a radar device detecting another vehicle on a periphery of the own vehicle and performs driving support of the own vehicle based on detection information about the other vehicle obtained from the radar device, comprising:
 a support ECU comprising a CPU and configured to:
 based on the detection information about the other vehicle, acquire a lateral position, lateral velocity, and lateral acceleration of the other vehicle in a cross direction crossing a traveling direction of the own vehicle;
 based on the lateral position and lateral velocity of the other vehicle, determine that the other vehicle travelling in an adjacent lane next to an own lane in which the own vehicle is travelling is moving toward the own lane;
 when the support ECU determines the movement of the other vehicle, determine whether the lateral acceleration of the other vehicle has increased to a negative side in the own lane, the negative side being a direction opposite to the lateral velocity of the other vehicle;

when the support ECU determines that the lateral acceleration of the other vehicle has increased to the negative side, set the other vehicle as a target vehicle of the driving support in the own lane, whereas when the support ECU determines that the other vehicle is moving toward the own lane and does not determine that the lateral acceleration of the other vehicle has increased to the negative side, not set the other vehicle as a target vehicle of the driving support in the own lane.

2. The driving support device according to claim 1, wherein when the support ECU determine the movement of the other vehicle and when the lateral acceleration of the other vehicle has increased to equal to or greater than a threshold to the negative side in the own lane, the support ECU is configured to determine that the lateral acceleration of the other vehicle has increased to the negative side in the own lane, and when the lateral velocity of the other vehicle is high, the threshold is set to a larger value than in a case where the lateral velocity of the other vehicle is low.

3. The driving support device according to claim 1, wherein the own lane is determined based on demarcation lines on both right and left sides of the own vehicle.

4. The driving support device according to claim 1, wherein the own lane is set to have a width of the own vehicle or a predetermined width centered on the own vehicle.

5. The driving support device according to claim 1, wherein, when the support ECU determines the movement of the other vehicle and when the lateral velocity of the other vehicle has not increased to the negative side from entry of the other vehicle into the own lane to arrival in an adjacent lane, the support ECU is configured not to determine that the lateral acceleration of the other vehicle has increased to the negative side in the own lane.

6. The driving support device according to claim 1, wherein, when the other vehicle is in the adjacent lane and when the other vehicle is moving in a direction approaching the own vehicle with the lateral velocity of the other vehicle being equal to or greater than a predetermined velocity, the support ECU is configured to determine that the other vehicle is moving toward the own lane.

7. The driving support device according to claim 1, wherein the support ECU is configured to perform a collision determination based on a distance to the other vehicle and a velocity relative to the other vehicle, wherein when the support ECU determines that the own vehicle and the other vehicle will collide with each other, the support ECU is configured to perform the driving support of the own vehicle.

8. A driving support device that is applied to an own vehicle equipped with a vehicle detection device detecting another vehicle on a periphery of the own vehicle and performs driving support of the own vehicle based on detection information about the other vehicle obtained from the vehicle detection device, comprising:

an acquisition unit that, based on the detection information about the other vehicle, acquires a lateral position, lateral velocity, and lateral acceleration of the other vehicle in a cross direction crossing a traveling direction of the own vehicle;

a first determination unit that, based on the lateral position and lateral velocity of the other vehicle, determines that the other vehicle travelling in an adjacent lane next to an own lane in which the own vehicle is travelling is moving toward the own lane;

a second determination unit that, when the first determination unit determines the movement of the other vehicle, determines whether the lateral acceleration of the other vehicle has increased to a negative side in the own lane, the negative side being a direction opposite to the lateral velocity of the other vehicle; and a driving support unit that, when the second determination unit determines that the lateral acceleration of the other vehicle has increased to the negative side, sets the other vehicle as a target vehicle of the driving support in the own lane, whereas when the first determination unit determines that the other vehicle is moving toward the own lane and the second determination unit does not determine that the lateral acceleration of the other vehicle has increased to the negative side, does not set the other vehicle as a target vehicle of the driving support in the own lane.

* * * * *